United States Patent
Yokoyama et al.

(10) Patent No.: US 12,434,578 B2
(45) Date of Patent: Oct. 7, 2025

(54) POWER FEED MAT

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP); Katsuya Kobayashi, Okazaki (JP); Takahiro Hirano, Gotemba (JP); Midori Sugiyama, Susono (JP); Ryunosuke Yamashita, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 705 days.

(21) Appl. No.: 17/851,033

(22) Filed: Jun. 28, 2022

(65) Prior Publication Data
US 2023/0001804 A1    Jan. 5, 2023

(30) Foreign Application Priority Data
Jun. 30, 2021 (JP) .................................. 2021-108860

(51) Int. Cl.
| | |
|---|---|
| *H02J 7/00* | (2006.01) |
| *B60L 53/12* | (2019.01) |
| *B60L 53/37* | (2019.01) |
| *B60L 53/38* | (2019.01) |
| *H02J 50/00* | (2016.01) |
| *H02J 50/10* | (2016.01) |
| *H02J 50/40* | (2016.01) |
| *H02J 50/60* | (2016.01) |
| *H02J 50/90* | (2016.01) |
| *H02J 7/35* | (2006.01) |

(52) U.S. Cl.
CPC .............. *B60L 53/12* (2019.02); *B60L 53/37* (2019.02); *B60L 53/38* (2019.02); *H02J 50/005* (2020.01); *H02J 50/10* (2016.02); *H02J 50/402* (2020.01); *H02J 50/60* (2016.02); *H02J 50/90* (2016.02); *H02J 7/35* (2013.01)

(58) Field of Classification Search
CPC ..... B60L 53/12; B60L 53/37; B60L 53/38; H02J 50/005; H02J 50/10; H02J 50/402; H02J 50/60; H02J 50/90; H02J 7/35
USPC .................................. 320/101, 108; 307/104
See application file for complete search history.

(56) References Cited

U.S. PATENT DOCUMENTS

| | | | |
|---|---|---|---|
| 2010/0314946 A1 | 12/2010 | Budde et al. | |
| 2017/0187243 A1 | 6/2017 | Sugiyama | |
| 2017/0358944 A1* | 12/2017 | Salter | ........................ F21V 5/10 |
| 2018/0198323 A1* | 7/2018 | Widmer | .................. B60L 53/60 |

FOREIGN PATENT DOCUMENTS

| | | |
|---|---|---|
| JP | 2010-508008 A | 3/2010 |
| JP | 2017-118690 A | 6/2017 |
| JP | 6145318 B2 | 6/2017 |
| JP | 2017-137701 A | 8/2017 |
| JP | 2018-157686 A | 10/2018 |
| WO | 2017/047498 A1 | 3/2017 |

* cited by examiner

*Primary Examiner* — Zixuan Zhou
(74) *Attorney, Agent, or Firm* — HAUPTMAN HAM, LLP

(57) ABSTRACT

A power feed mat includes a substrate including a power transmission coil capable of transmitting electric power to a power reception coil mounted on a vehicle and a cover sheet that covers the power transmission coil and at least one functional layer that can be provided at at least one of a position above the substrate and a position below the substrate and performs a prescribed function.

9 Claims, 3 Drawing Sheets

POWER FEED MAT

This nonprovisional application is based on Japanese Patent Application No. 2021-108860 filed with the Japan Patent Office on Jun. 30, 2021, the entire contents of which are hereby incorporated by reference.

BACKGROUND

Field

The present disclosure relates to a power feed mat.

Description of the Background Art

A power feed mat that is portable and can wirelessly charge a vehicle and the like has conventionally been known. For example, Japanese Patent No. 6145318 discloses a power transmission coil member including a power transmission coil that transmits electromagnetic waves for power transmission to a power reception coil mounted on a vehicle and a sheet material which is a pliable sheet that covers the power transmission coil. This power transmission coil member is portable.

SUMMARY

A location where the power transmission coil member as described in Japanese Patent No. 6145318 is used or a purpose of use thereof is different depending on a user, and therefore a function desired therefor is different for each user.

An object of the present disclosure is to provide a power feed mat to which a function desired by a user can be provided.

A power feed mat according to one aspect of the present disclosure includes a substrate including a power transmission coil that transmits electric power to a power reception coil mounted on a vehicle and a cover sheet that covers the power transmission coil and at least one functional layer that can be provided at at least one of a position above the substrate and a position below the substrate and performs a prescribed function.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
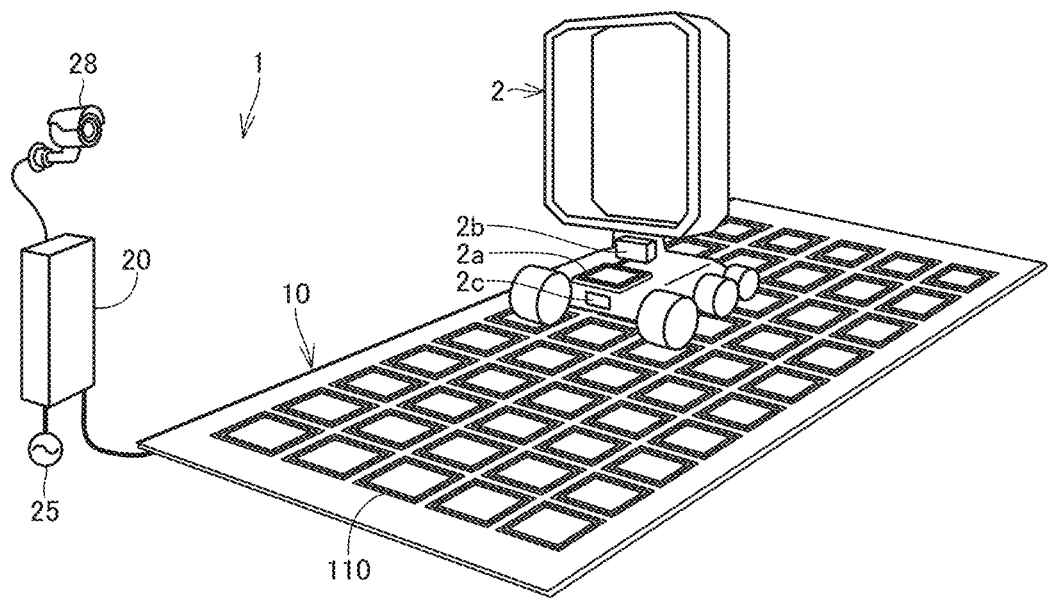
FIG. 1 is a perspective view schematically showing a configuration of a wireless charging system including a power feed mat in one embodiment of the present disclosure.

An embodiment of the present disclosure will be described with reference to the drawings. The same or corresponding members in the drawings referred to below have the same reference characters allotted.

Figure 2:
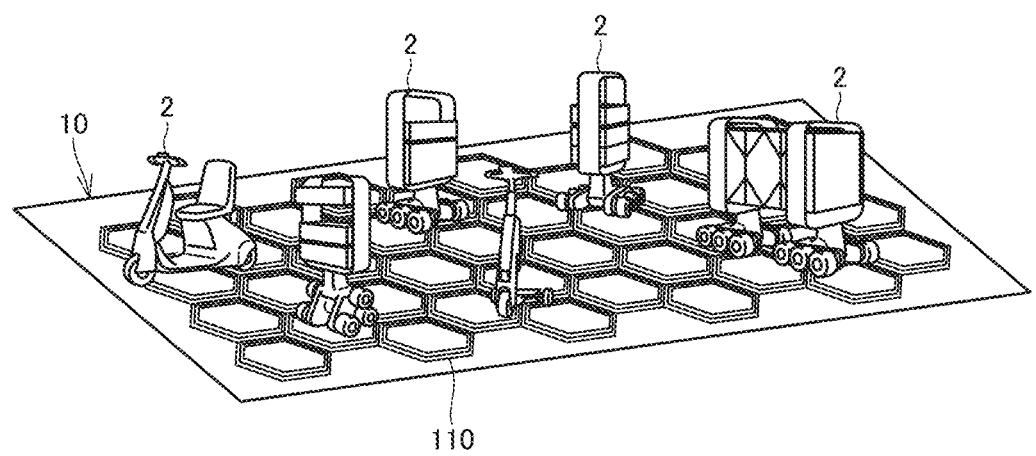
FIG. 2 is a perspective view schematically showing a state in which a plurality of vehicles are located on the power feed mat.

FIG. 1 is a perspective view schematically showing a configuration of a wireless charging system including a power feed mat in one embodiment of the present disclosure. FIG. 2 is a perspective view schematically showing a state in which a plurality of vehicles are located on the power feed mat.

Examples of a vehicle 2 include not only a hybrid electric vehicle (HEY), a plug-in hybrid electric vehicle (PHEV), and a battery electric vehicle (BEV) but also, for example, a small mobility with a seat capacity of one or two passengers and an autonomous vehicle capable of transporting a load without human intervention as shown in FIGS. 1 and 2. As shown in FIG. 1, vehicle 2 includes a power reception coil 2a, a power storage 2b, and a camera 2c.

As shown in FIG. 1, a wireless charging system 1 includes a power feed mat 10 and a power feed apparatus 20.

Figure 3:
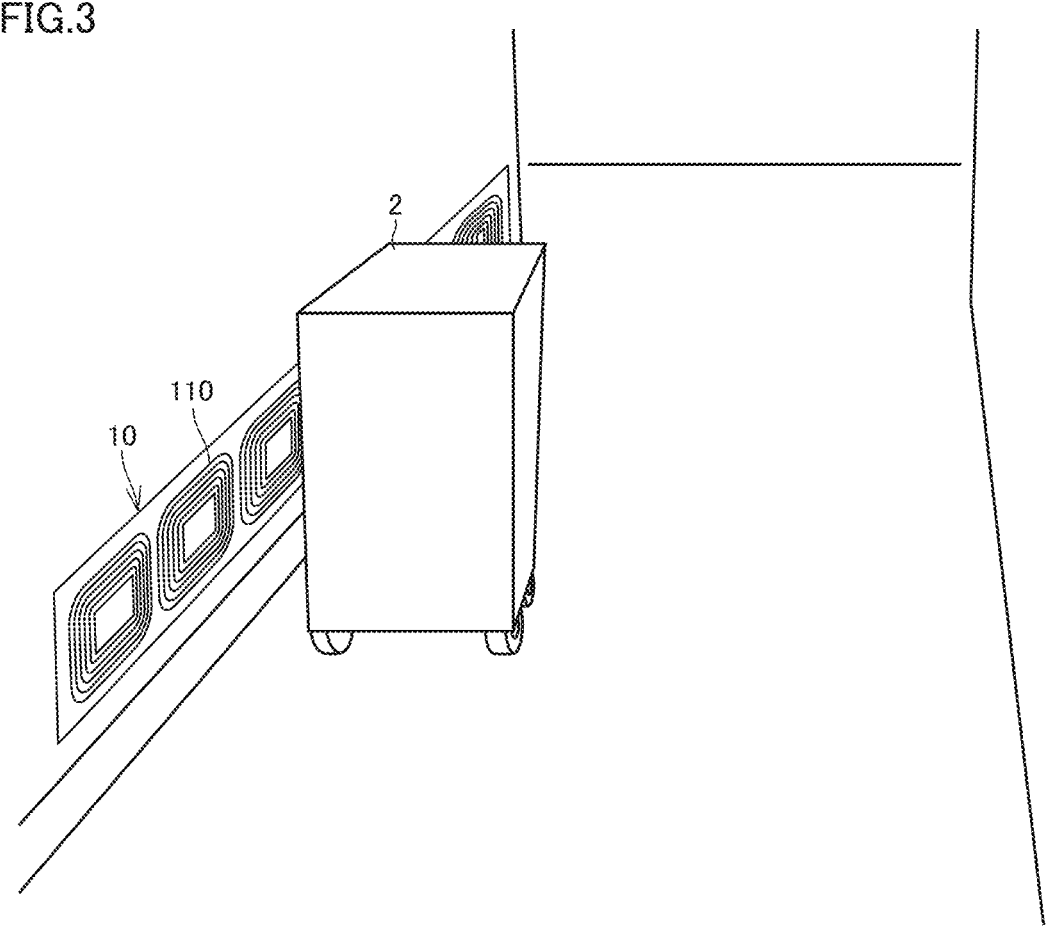
FIG. 3 is a perspective view schematically showing a state in which the power feed mat is placed on a wall surface.
Figure 4:
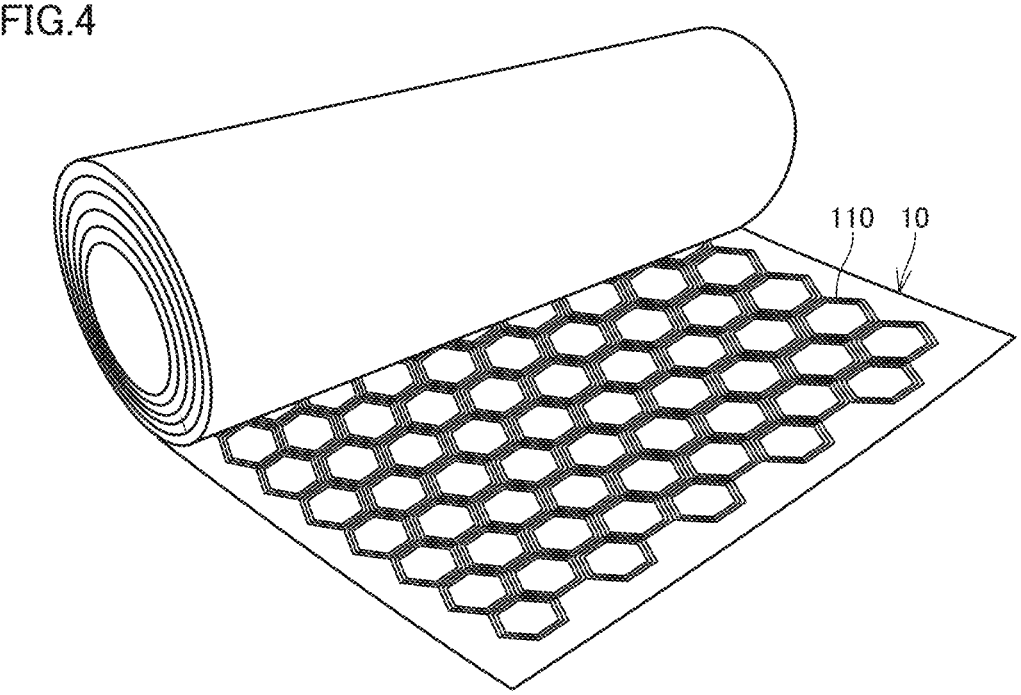
FIG. 4 is a perspective view schematically showing a state in which the power feed mat is rolled.

Power feed mat 10 can wirelessly send electric power to vehicle 2. Power feed mat 10 may be placed on a road surface or the like as shown in FIGS. 1 and 2 or on a wall surface as shown in FIG. 3. As shown in FIG. 4, power feed mat 100 may be flexible or pliable as being rolled. Power feed mat 10 includes a substrate 100 and at least one functional layer 200.

Figure 5:
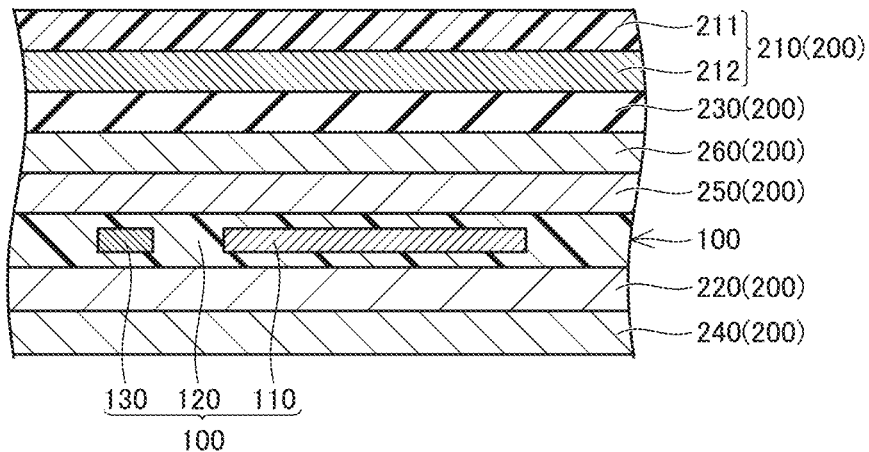
FIG. 5 is a cross-sectional view of the power feed mat.

As shown in FIG. 5, substrate 100 includes at least one power transmission coil 110, a cover sheet 120, and an antenna 130. In the present embodiment, at least one power transmission coil 110 includes a plurality of power transmission coils 110.

Power transmission coil 110 can wirelessly transmit electric power to power reception coil 2a mounted on vehicle 2. While power reception coil 2a is located above power transmission coil 110, power transmission coil 110 sends electromagnetic waves for power transmission to that power reception coil 2a. Power reception coil 2a charges power storage 2b with electric power generated based on the electromagnetic waves. Power transmission coil 110 may be formed in a quadrangular shape in a plan view as shown in FIGS. 1 and 3, in a hexagonal shape in the plan view as shown in FIGS. 2 and 4, or in a shape different from the quadrangular shape and the hexagonal shape in the plan view.

Cover sheet 120 covers power transmission coil 110. Cover sheet 120 is composed of glass, an epoxy resin, or the like. Though power transmission coil 110 is covered with cover sheet 120, FIGS. 1 to 4 show power transmission coil 110 with a solid line.

Antenna 130 is provided within cover sheet 120. Antenna 130 is, for example, a loop antenna. Antenna 130 superimposes on electromagnetic waves sent from power transmission coil 110 to power reception coil 2a, information lower in frequency than the electromagnetic waves. Examples of the information include position information of vehicle 2, an amount of power feed requested by vehicle 2, and an identification number of vehicle 2.

Power feed apparatus 20 supplies electric power to power feed mat 10. Power feed apparatus 20 can be connected to an alternating-current (AC) power supply 25. Power feed apparatus 20 converts a voltage of AC power supplied from AC power supply 25 into an appropriate value and supplies resultant AC power to power feed mat 10.

Power feed apparatus 20 may include a sensor unit 28. Sensor unit 28 detects a position of vehicle 2 that passes over power feed mat 10. Sensor unit 28 includes at least one of a camera, a radar, and a laser imaging detection and ranging (LIDAR).

At least one functional layer 200 performs a prescribed function. At least one functional layer 200 can be provided at at least one of a position above substrate 100 and a position below substrate 100. In the present embodiment, as shown in FIG. 5, at least one functional layer 200 includes an upper protective layer 210, a heat radiation layer 220, a representation layer 230, a lower protective layer 240, a foreign matter sensing layer 250, and a living body sensing layer 260. Layers 210 to 260 and substrate 100 may be constructed to be attachable and removable to and from each other in a direction of thickness (an upward/downward direction in FIG. 5) of substrate 100 or may integrally be fixed to each other (as not being attachable or removable). A structure that allows layers 210 to 260 and substrate 100 to be attachable and removable includes fitting by using projections and recesses, fastening with a fastening member such as a bolt, and connection by using a hook-and-loop fastener.

Upper protective layer 210 performs as the prescribed function, a function to protect substrate 100. Upper protective layer 210 can be provided above substrate 100. Upper protective layer 210 performs as the function to protect substrate 100, at least one of a function to reduce occurrence of stress concentration, a waterproof function, and a snow-melting function. In the present embodiment, upper protective layer 210 includes a first protective layer 211 that performs the function to reduce occurrence of stress concentration and the waterproof function and a second protective layer 212 that performs the snow-melting function.

First protective layer 211 reduces occurrence of stress concentration to substrate 100 caused by a weight of vehicle 2 and improves waterproofness of substrate 100. First protective layer 211 is composed of a material (polycarbonate or the like) higher in rigidity than cover sheet 120 or a material (rubber or the like) lower in rigidity than cover sheet 120. First protective layer 211 is preferably composed of a light-transmissive material.

Second protective layer 212 can be provided on a lower surface of first protective layer 211. Second protective layer 212 includes a heating unit such as a heater. This heating unit is activated when accumulation of snow on first protective layer 211 is sensed. Second protective layer 212 is preferably composed of a light-transmissive material. Second protective layer 212 does not have to be provided.

Heat radiation layer 220 performs as the prescribed function, a function to radiate heat of substrate 100. Heat radiation layer 220 can be provided as being in contact with an upper surface or a lower surface of substrate 100. In the present embodiment, as shown in FIG. 5, heat radiation layer 220 can be provided as being in contact with the lower surface of substrate 100. Heat radiation layer 220 is composed of a material higher in thermal conductivity than cover sheet 120 of substrate 100. Heat radiation layer 220 is formed, for example, by adding thermally conductive particles to silicone rubber.

Though not shown, heat radiation layer 220 can also be provided as being in contact with the upper surface of substrate 100. In this case, preferably, a surface (lower surface) of heat radiation layer 220 opposed to the upper surface of substrate 100 is formed as a rough surface, so that a heat radiation space is provided between the upper surface of substrate 100 and the lower surface of heat radiation layer 220.

Representation layer 230 performs a representation function as the prescribed function. Representation layer 230 can be provided above substrate 100. When upper protective layer 210 is provided above substrate 100, representation layer 230 is provided between substrate 100 and upper protective layer 210. Representation layer 230 can provide prescribed representation by optical representation. Examples of the prescribed representation include representation that guides a vehicle. The prescribed representation is changed as appropriate by power feed apparatus 20. Representation by representation layer 230 is read by camera 2c mounted on vehicle 2.

Lower protective layer 240 performs as the prescribed function, a function to protect substrate 100. Lower protective layer 240 can be provided below substrate 100. When heat radiation layer 220 is provided below substrate 100, lower protective layer 240 is provided below heat radiation layer 220. Lower protective layer 240 performs a function to cut off electromagnetic waves. Lower protective layer 240 contains a material (a metal or ferrite) capable of cutting off electromagnetic waves.

Foreign matter sensing layer 250 performs as the prescribed function, a function to sense a foreign matter present above substrate 100. Foreign matter sensing layer 250 can be provided above substrate 100. Foreign matter sensing layer 250 is provided as being in contact with the upper surface of substrate 100. Foreign matter sensing layer 250 includes a coil that detects a metal.

Living body sensing layer 260 performs as the prescribed function, a function to sense a living body (a human or an animal) present above substrate 100. Living body sensing layer 260 can be provided above substrate 100. As shown in FIG. 5, living body sensing layer 260 may be provided as being in contact with an upper surface of foreign matter sensing layer 250 or with the upper surface of substrate 100. Living body sensing layer 260 includes, for example, a sensor that senses a capacitance.

Since any functional layer 200 can be combined with substrate 100 in this power feed mat 10 as described above, a function desired by a user can be provided to substrate 100.

Figure 6:
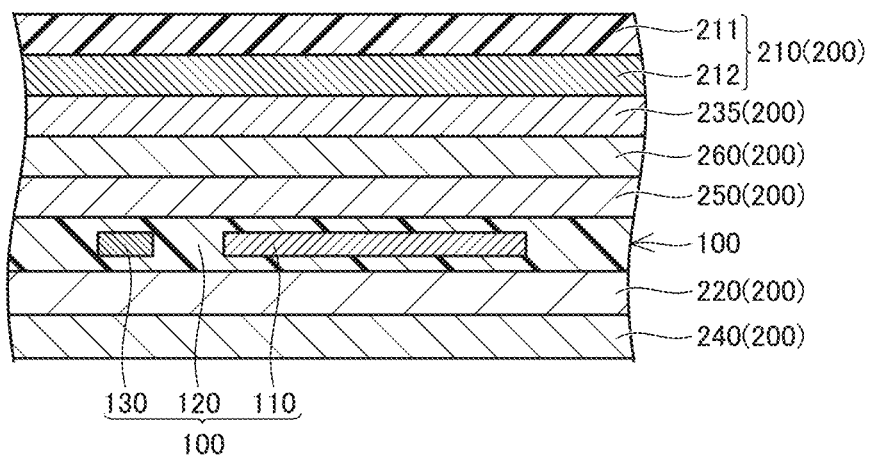
FIG. 6 is a cross-sectional view of a modification of the power feed mat.

In the embodiment, as shown in FIG. 6, a power generation layer 235 that performs a power generation function as the prescribed function may be provided instead of representation layer 230. Power generation layer 235 is preferably composed of a solar photovoltaic panel.

Though an example in which power feed mat 10 includes a plurality of functional layers 200 is described in the embodiment, power feed mat 10 should only include only one of the plurality of functional layers 200.

An illustrative embodiment described above is understood by a person skilled in the art as specific examples of aspects below.

A power feed mat in the embodiment includes a substrate including a power transmission coil that transmits electric power to a power reception coil mounted on a vehicle and a cover sheet that covers the power transmission coil and at least one functional layer that can be provided at at least one of a position above the substrate and a position below the substrate and performs a prescribed function.

In the embodiment, since a functional layer can be combined with the substrate, a function desired by a user can be provided to the substrate.

The at least one functional layer may include an upper protective layer that can be provided above the substrate and performs as the prescribed function, a function to protect the substrate.

In this aspect, the upper protective layer effectively protects the substrate.

The upper protective layer preferably includes as the function to protect the substrate, at least one of a function to reduce occurrence of stress concentration, a waterproof function, and a snow melting function.

The at least one functional layer may include a heat radiation layer that can be provided as being in contact with an upper surface or a lower surface of the substrate and performs as the prescribed function, a function to radiate heat of the substrate. In this case, the heat radiation layer is preferably higher in thermal conductivity than the substrate.

In this aspect, heat generated in the power transmission coil is effectively radiated to the road surface or the like through the heat radiation layer.

The at least one functional layer may include a representation layer that can be provided above the substrate and performs a representation function as the prescribed function. Preferably, the representation layer can provide prescribed representation by optical representation.

In this case, the prescribed representation is preferably representation that guides the vehicle.

In this aspect, the vehicle can be guided (change a direction of movement) by reading the prescribed representation with the camera or the like mounted on the vehicle.

The at least one functional layer may include a power generation layer that can be provided above the substrate and performs a power generation function as the prescribed function.

In this case, preferably, the power generation layer is composed of a solar photovoltaic panel.

The at least one functional layer may include a lower protective layer that can be provided below the substrate and performs as the prescribed function, a function to protect the substrate.

In this case, preferably, the lower protective layer performs as the function to protect the substrate, a function to cut off electromagnetic waves.

In this aspect, downward propagation of electromagnetic waves from the power transmission coil is suppressed.

The substrate may include an antenna that communicates with the vehicle. In this case, preferably, the antenna superimposes on electromagnetic waves sent from the power transmission coil to the power reception coil, information lower in frequency than the electromagnetic waves.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power feed mat comprising:
a substrate including a power transmission coil that transmits electric power to a power reception coil mounted on a vehicle and a cover sheet that covers the power transmission coil; and
at least one functional layer that can be provided at least one of a position above the substrate and a position below the substrate and performs a prescribed function, wherein
the at least one functional layer includes a power generation layer that can be provided above the substrate and performs a power generation function as the prescribed function, and
the power generation layer is composed of a solar photovoltaic panel.

2. The power feed mat according to claim 1, wherein
the at least one functional layer includes an upper protective layer that can be provided above the substrate and performs as the prescribed function, a function to protect the substrate.

3. The power feed mat according to claim 2, wherein
the upper protective layer includes as the function to protect the substrate, at least one of a function to reduce occurrence of stress concentration, a waterproof function, and a snow melting function.

4. The power feed mat according to claim 1, wherein
the at least one functional layer includes a heat radiation layer that can be provided as being in contact with an upper surface or a lower surface of the substrate and performs as the prescribed function, a function to radiate heat of the substrate, and
the heat radiation layer is higher in thermal conductivity than the substrate.

5. The power feed mat according to claim 1, wherein
the at least one functional layer includes a representation layer that can be provided above the substrate and performs a representation function as the prescribed function, and
the representation layer can provide prescribed representation by optical representation.

6. The power feed mat according to claim 5, wherein
the prescribed representation is representation that guides the vehicle.

7. The power feed mat according to claim 1, wherein
the at least one functional layer includes a lower protective layer that can be provided below the substrate and performs as the prescribed function, a function to protect the substrate.

8. The power feed mat according to claim 7, wherein
the lower protective layer performs as the function to protect the substrate, a function to cut off electromagnetic waves.

9. The power feed mat according to claim 1, wherein
the substrate includes an antenna that communicates with the vehicle, and
the antenna superimposes on electromagnetic waves sent from the power transmission coil to the power reception coil, information lower in frequency than the electromagnetic waves.

* * * * *